US012526354B2

(12) United States Patent
Reeve et al.

(10) Patent No.: US 12,526,354 B2
(45) Date of Patent: Jan. 13, 2026

(54) FAULT-TOLERANT INTEGRATION SERVER FLOWS

(71) Applicant: INTERNATIONAL BUSINESS MACHINES CORPORATION, Armonk, NY (US)

(72) Inventors: John Anthony Reeve, Winchester (GB); Andrew John Coleman, Petersfield (GB); Trevor Clifford Dolby, Edina, MN (US)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 18/586,045

(22) Filed: Feb. 23, 2024

(65) Prior Publication Data

US 2025/0274539 A1     Aug. 28, 2025

(51) Int. Cl.
*H04L 69/40* (2022.01)
*H04L 47/62* (2022.01)

(52) U.S. Cl.
CPC .......... *H04L 69/40* (2013.01); *H04L 47/6215* (2013.01)

(58) Field of Classification Search
CPC ............................ H04L 69/40; H04L 47/6215
See application file for complete search history.

(56) References Cited

U.S. PATENT DOCUMENTS

| | | | |
|---|---|---|---|
| 7,793,140 B2 * | 9/2010 | Chen ....................... | H04L 41/06 714/4.11 |
| 7,930,416 B2 * | 4/2011 | Miller ................ | G06Q 30/0633 709/224 |
| 9,021,300 B2 * | 4/2015 | Le Rouzic .......... | H04L 65/1045 714/15 |
| 11,770,447 B2 | 9/2023 | Joseph et al. | |
| 11,924,089 B2 * | 3/2024 | Atov ...................... | H04L 45/306 |

(Continued)

FOREIGN PATENT DOCUMENTS

| | | |
|---|---|---|
| CN | 102833273 | 12/2012 |
| CN | 114884838 | 8/2022 |

(Continued)

OTHER PUBLICATIONS

Bertolli, et al., "The Co-Replication Methodology and its Application to Structured Parallel Programs", 2007 Symposium on Component and Framework Technology in High-Performance and Scientific Computing, Oct. 2007, 10 Pages.

(Continued)

*Primary Examiner* — Benjamin M Thieu
(74) *Attorney, Agent, or Firm* — Monchai Chuaychoo; Andrew D. Wright; Calderon Safran & Wright P.C.

(57) ABSTRACT

A computer-implemented method for retrieving, by a second integration server from a queuing system, a first state message comprising a flow correlation identification (ID). The method further includes initializing, by the second integration server, an integration flow based on the flow correlation ID and processing, by the second integration server, the integration flow as a backup integration server to a first integration server. In response to determining that the first integration server has failed, the method further includes processing, by the second integration server, the integration flow as a primary integration server.

20 Claims, 6 Drawing Sheets

(56) References Cited

U.S. PATENT DOCUMENTS

| | | | | |
|---|---|---|---|---|
| 2013/0054822 A1* | 2/2013 | Mordani | ................ | H04L 69/40 |
| | | | | 709/228 |
| 2017/0180512 A1* | 6/2017 | Simkin | ................ | H04L 65/611 |
| 2017/0322855 A1* | 11/2017 | Hammam | ........... | G06F 11/2005 |
| 2023/0208923 A1* | 6/2023 | Woodworth | ........ | H04L 63/0428 |
| | | | | 709/223 |

FOREIGN PATENT DOCUMENTS

| | | | | |
|---|---|---|---|---|
| JP | 6503174 | 4/2015 | | |
| WO | WO-2014027989 A1 * | 2/2014 | ......... | H04L 67/1034 |

OTHER PUBLICATIONS

Lefray, et al., "Replication for Send-Deterministic MPI HPC Applications", Jun. 18, 2013, Proceedings of the 3rd Workshop on Fault-Tolerance for HPC at Extreme Scale, 8 Pages.

* cited by examiner

FAULT-TOLERANT INTEGRATION SERVER FLOWS

BACKGROUND

Aspects of the present invention relate generally to fault-tolerant integration server flows and, more particularly, to creating highly available and fault-tolerant integration server flows.

Integration servers are a type of computer server that facilitates the interaction between different operating systems, services, and/or applications across an enterprise's information technology (IT) environment. With the aid of an integration server, these different operating systems, services, and/or applications can generally communicate with each other, regardless of their underlying platform or architecture. Integration servers may also serve as an intermediate, or middleware, server to eliminate compatibility and interoperability issues between different platforms and architectures, when necessary.

Many integration servers include a message transport system that manages a group of message flows assigned to a node. An integration flow is an automated workflow used to propagate data between multiple applications or services. Typically, an integration flow includes receiving data from a source application, transforming the data according to a set of predefined rules, and sending the transformed data to one or multiple target applications.

SUMMARY

In a first aspect of the invention, there is a computer-implemented method including: retrieving, by a second integration server from a queuing system, a first state message comprising a flow correlation identification (ID); initializing, by the second integration server, the an integration flow based on the flow correlation ID; processing, by the second integration server, the integration flow as a backup integration server to a first integration server; and in response to determining that the first integration server has failed, processing, by the second integration server, the integration flow as a primary integration server.

In another aspect of the invention, there is a computer program product including one or more computer readable storage media having program instructions collectively stored on the one or more computer readable storage media. The program instructions are executable to: retrieve, from a queuing system, a first state message comprising a flow correlation identification (ID); initialize, an integration flow based on the flow correlation ID; process the integration flow as a backup integration server to a first integration server; and in response to determining that the first integration server has failed, process the integration flow as a primary integration server.

In another aspect of the invention, there is a system including a processor set, one or more computer readable storage media, and program instructions collectively stored on the one or more computer readable storage media. The program instructions are executable to: retrieve, from a queuing system, a first state message comprising a flow correlation identification (ID); initialize, an integration flow based on the flow correlation ID; process the integration flow as a backup integration server to a first integration server; and in response to determining that the first integration server has failed, process the integration flow as a primary integration server.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
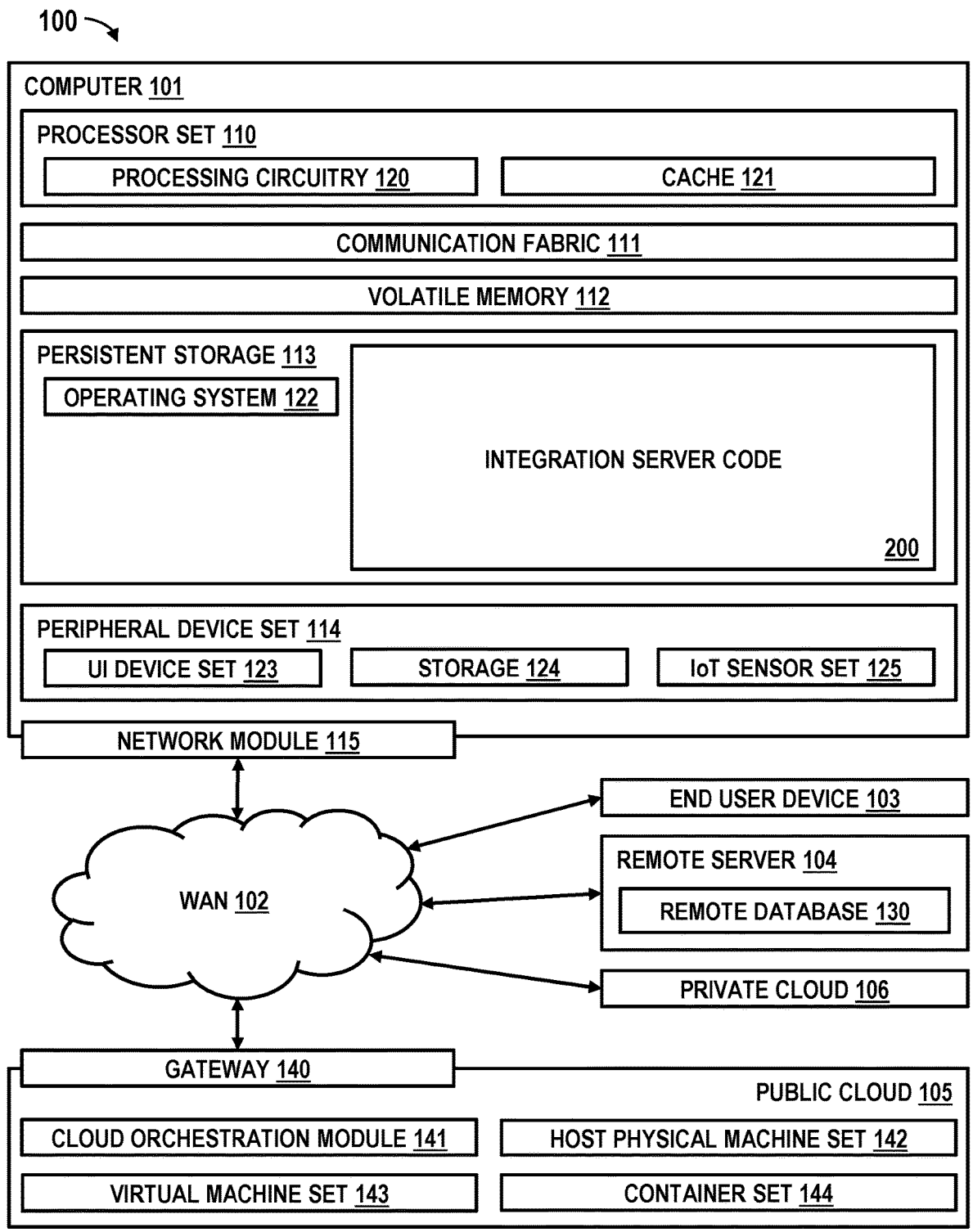
FIG. 1 depicts a computing environment according to an embodiment of the present invention.

Aspects of the present invention relate generally to fault-tolerant integration server flows and, more particularly, to creating highly available and fault-tolerant integration flows. As used herein, an integration server flow, also referred to as an integration flow, is an executable program performed by the integration server to complete an integration request. According to aspects of the invention an integration server is run with multiple replicas in a computing cluster (e.g., a Kubernetes cluster), or similar orchestration system, the same integration flow can process the same event simultaneously in two integration servers but with only one primary integration server interacting with the external systems. According to aspects of the invention, if the primary integration server crashes, one of the backup integration servers can continue to process the integration flow without the need to retrieve state or start processing from the beginning again.

According to an aspect of the invention, there is a computer-implemented method for creating an uninterrupted flow between one or more integration servers, the computer-implemented method including: receiving a first integration request from one or more integration requests to process between the one or more integration servers; invoking a state sender process, by a first pod belonging to a first integration server of the one or more integration servers; creating a message, by the first pod, based on the one or more integration requests and as part of the state sender process, where the message comprises: a pod name that is running a flow, a message relating to the flow, a flow identification (ID) for correlating requests and replies, and a status state causing the flow to be triggered; receiving the message, by a state reader, belonging to a second pod of a second integration server of the one or more integration servers, wherein the message is retrieved from a follow queue as part of a queue system; sending a reply back, by the state reader, to a reply queue as part of the queue system and sending the reply back to the state sender; processing the first integration request by the state sender; receiving a flow ID from a state queue as part of the queue system and validating the flow ID; executing the first integration request until the request has been fulfilled; requesting a state from the state reader associated with the first integration request; monitoring an application program interface (API) server, by the state reader, to determine if the first pod is still running; and in response to the first pod not running, taking over the integration request processing.

Implementations of the invention are necessarily rooted in computer technology. For example, the steps of retrieving a first state message comprising a flow correlation identification (ID), initializing an integration flow based on the flow correlation ID, processing the integration flow as a backup integration server to a first integration server, and in response to determining that the first integration server has failed, processing the integration flow as a primary integration server, are computer-based and cannot be performed in the human mind. Given this scale and complexity, it is simply not possible for the human mind, or for a person using pen and paper, to perform the number of calculations involved in training and/or using a machine learning model.

Implementation of the invention improves the technological field of data integration, and it improves the functioning of a computer. As used herein, integration software is used to transfer data between different applications. In other words, conventional integration software takes data from one application or system, transforms the data, and applies it in a new application or system. In existing technologies, when the integration software fails, stalls, freezes, etc., the system restarts from the beginning of the process. Due to the complexity involved in data integration, having to start over at the beginning of an integration request is wasteful, inefficient, and costly. Specifically, the system will spend large amounts of time duplicating work that was lost when the system failed. Aspects of the instant invention provide a backup integration server that follows a primary integration flow and can take over the primary integration server duties in the event of a failure with little or no wasted time and/or processing, thereby improving the technological field of data integration and improving the functioning of a computer by creating more available and more fault-tolerant integration server flows.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as the integration server code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
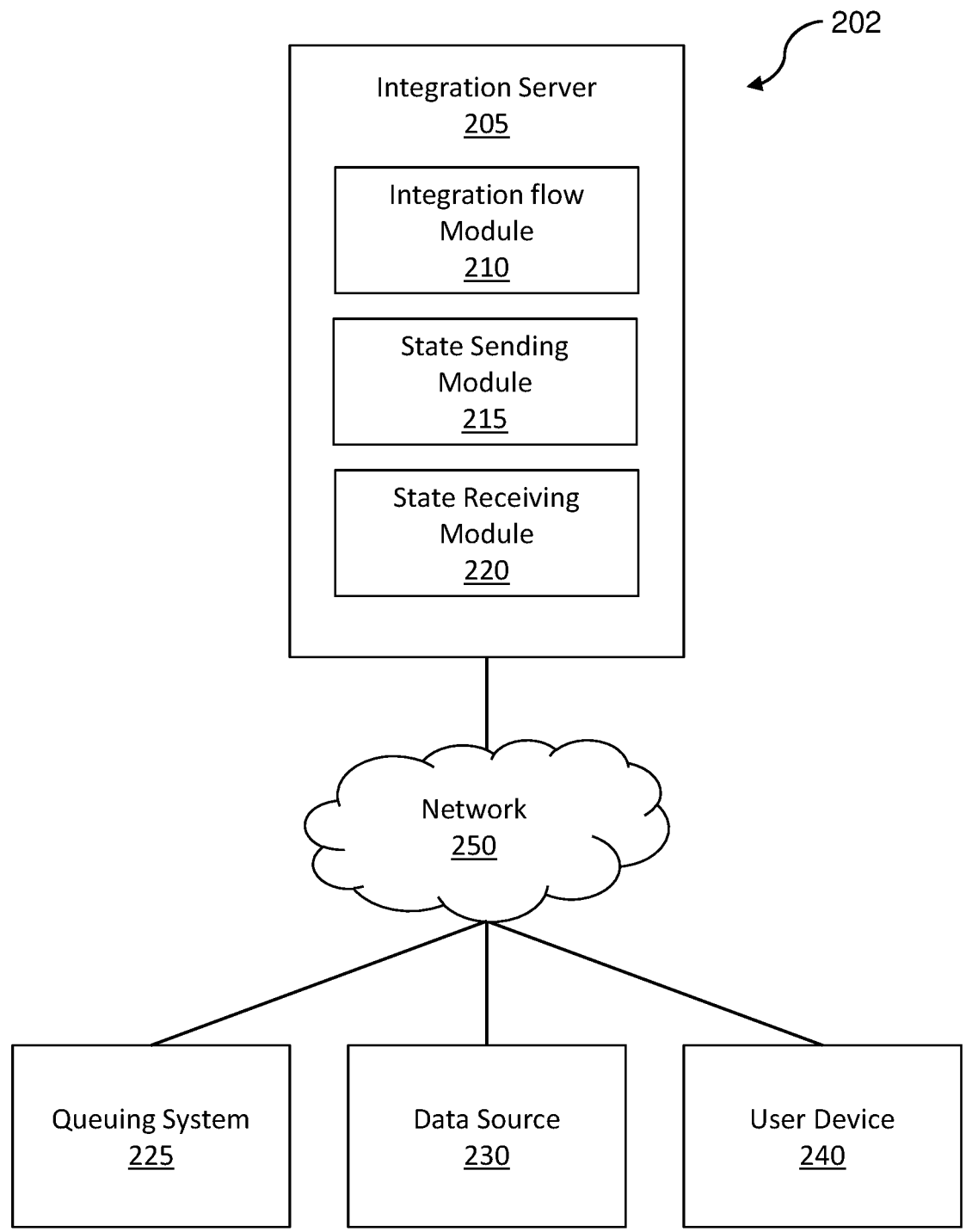
FIG. 2 shows a block diagram of an exemplary environment in accordance with aspects of the present invention.

FIG. 2 shows a block diagram of exemplary environment 202 in accordance with aspects of the invention. In embodiments, environment 202 includes integration server 205, queuing system 225, data source 230, user device 240, and network 250.

Integration server 205 may comprise one or more instances of computer 101 of FIG. 1. In another example, integration server 205 may comprise one or more virtual machines or containers running on one or more instances of computer 101 of FIG. 1. In embodiments, integration server 205 communicates with queuing system 225, data source 230, and user device 240 via network 250, which may comprise WAN 102 of FIG. 1. In embodiments, queuing system 225 comprises one or more instances of remote database 130 and/or remote server 104 of FIG. 1. In embodiments, data source 230 comprises one or more data sources each comprising an instance of remote database 130 and/or remote server 104 of FIG. 1. In embodiments, user device 240 comprises one or more instances of end user device 103 of FIG. 1. There may be plural different instances of user device 240 including, for example, user-accessible servers and/or personal computing devices. The different instances of user device 240 may be used by different users and evaluators, respectively.

In embodiments, integration server 205 of FIG. 2 comprises integration flow module 210, state sending module 215, and state receiving module 220, each of which may comprise modules of user/group teleportation code of block 200 of FIG. 1. Such modules may include routines, programs, objects, components, logic, data structures, and so on that perform a particular task (or tasks) or implement a particular data type (or types) that the user/group teleportation code of block 200 uses to carry out the functions and/or methodologies of embodiments of the invention as described herein. These modules of user/group teleportation code of block 200 are executable by computer 101 of FIG. 1 (e.g., processing circuitry 120 of FIG. 1) to perform the inventive methods as described herein. Integration server 205 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the invention, integration flow module 210 is configured to process an integration request by carrying out each of the processing steps (i.e., integration flow), as dictated by the integration request.

In accordance with aspects of the invention, state sending module 215 is configured to send state messages to queuing system 225 when integration server 205 is acting (or operating) as a primary integration server. In other words, as integration flow module 210 completes the processing steps (i.e., integration flow), as dictated by the integration request, state sending module 215 sends (i.e., shares, transmits, and/or uploads) a state message after each step is complete. In embodiments, the state messages comprise at least one of: a pod name for the integration server that is running the flow, the message flow that will be invoked or processed, an identification (ID) for correlating requests and replies related to the integration flow (e.g., a correlation ID), and/or the state that is causing the integration flow to be triggered (e.g., the content of a queued message or the content of an HTTP request). In additional embodiments, the state message may further (or alternatively) comprise non-deterministic data.

As used herein, non-deterministic data is data that cannot be reproduced by a backup integration server because it is not guaranteed that the process will return the same result if run by a different integration server at a different time. For example, non-deterministic data may include data that is received in response to an external request made to an external application or program. Non-deterministic data may also include data that requires, relies on, or is the result of, a time-based calculation, a randomized variable generation, and/or a timestamp. Conversely, deterministic data is data that can be reproduced by a backup integration server and obtain the same result as a primary integration server.

In accordance with aspects of the invention, state receiving module 220 is configured to retrieve and/or receive state messages from queuing system 225 when integration server 205 is acting (or operating) as a backup integration server. In other words, as integration flow module 210 completes the processing steps (i.e., integration flow), as dictated by the integration request, state receiving module 220 retrieves (i.e., reads, receives, accesses, and/or downloads) a state message after each step is complete.

Figure 3A:
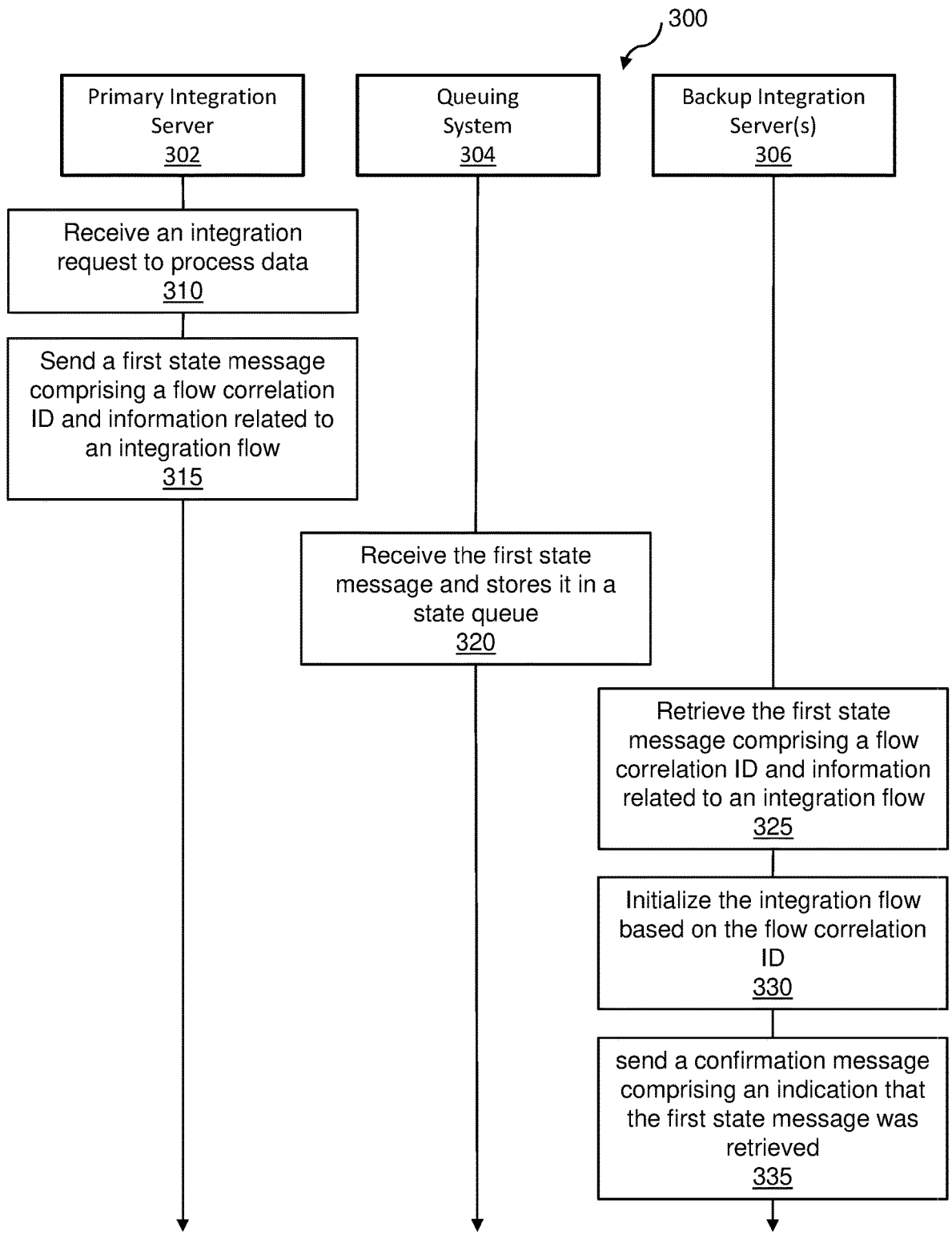
FIGS. 3A-C show a flowchart of an exemplary method in accordance with aspects of the present invention.
Figure 3B:
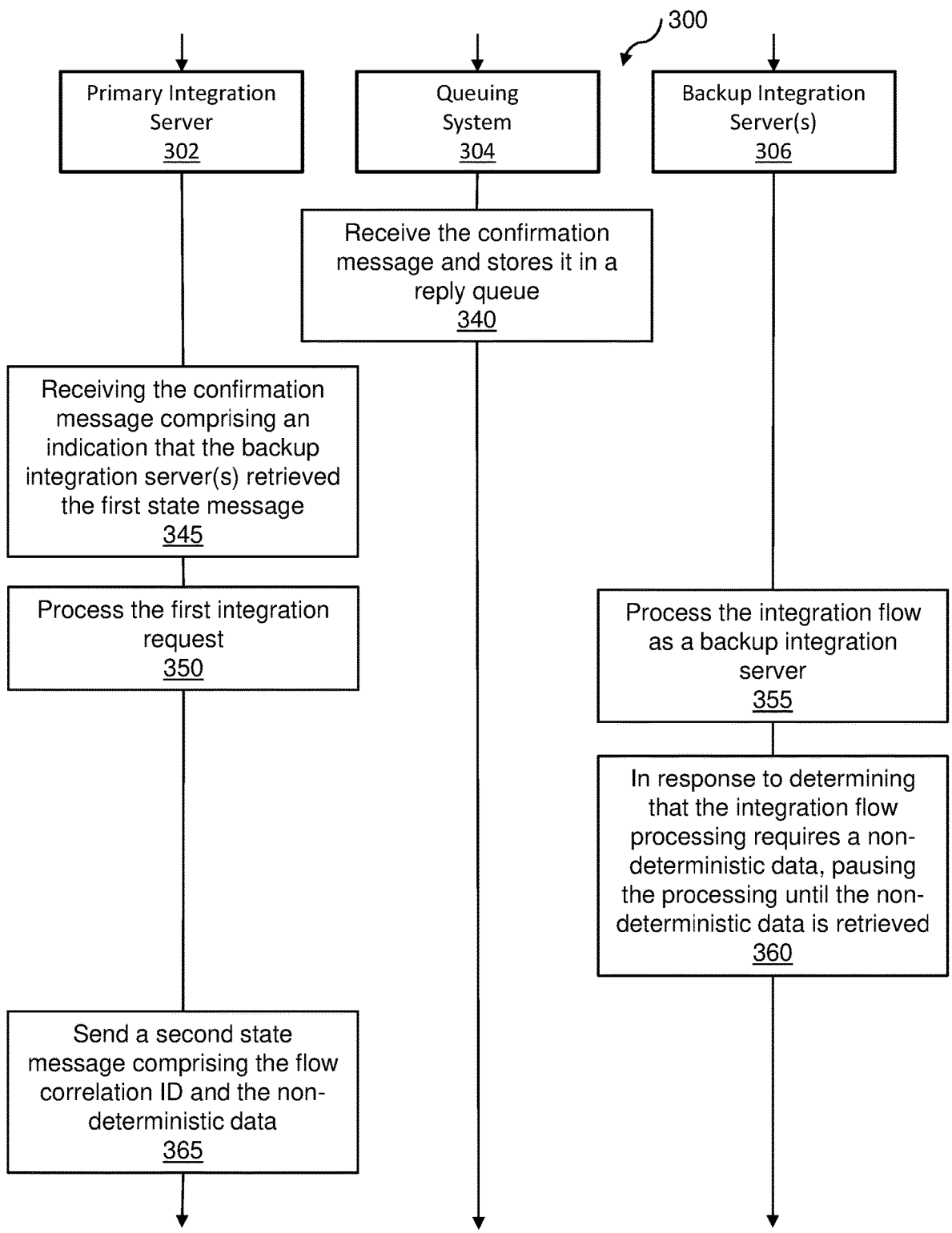
Figure 3C:
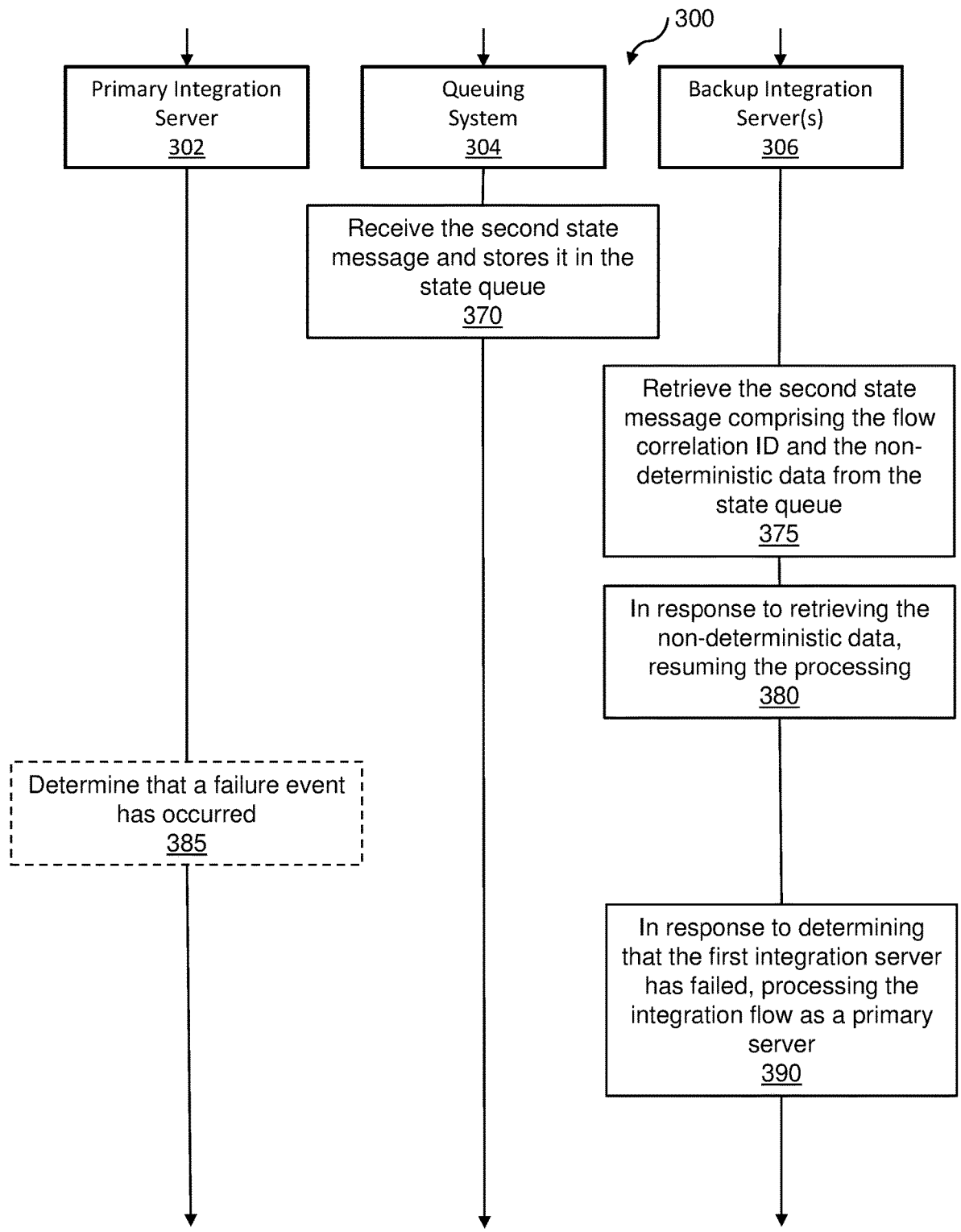

FIGS. 3A-C show a flowchart of exemplary method 300 in accordance with aspects of the present invention. Steps of the method may be carried out in the environment of FIG. 2 and are described with reference to elements depicted in FIG. 2. For example, in embodiments, primary integration server 302 may comprise an instance of integration server 205 of FIG. 2, queuing system 304 may comprise an instance of queuing system 225 of FIG. 2, and backup integration server(s) 306 may comprise one or more instances of integration server 205 of FIG. 2.

At block 310 of FIG. 3A, primary integration server 302 receives an integration request to process data. As used herein, an integration request comprises a request to perform integration processing from one application to one or more other applications. An integration request may be received as a message on a queue, or it may be received as a hypertext transfer protocol (HTTP) request. In embodiments, the integration request comprises client-submitted request data and/or application data to be transformed via integration.

At block 315, primary integration server 302 sends a state message comprising a flow correlation ID and information related to an integration flow. Specifically, primary integration server 302 sends, to a queuing system, a first state message. In an embodiment, the first state message comprises at least one of: a pod name for the integration server that is running the flow (i.e., primary integration server 302), the message flow (e.g., integration flow) that will be invoked or processed, an identification (ID) for correlating requests and replies related to the integration flow (e.g., a correlation ID), and/or the state that is causing the integration flow to be triggered (e.g., the content of a queued message or the content of an HTTP request).

At block 320, queuing system 304 receives the first state message from primary integration server 302 and stores the first state message in a state queue within queuing system 304. As used herein, a state queue is a queue for storing state information related to the integration flow while processing an integration request. In embodiments, the state information is stored such that backup integration servers (e.g., backup integration server(s) 306) can access and retrieve/read the state information. In embodiments, queuing system 304 may be configured to send the state information stored in the state queue to backup integration servers.

At block 325, backup integration server(s) 306 retrieves the first state message comprising a flow correlation ID and information related to an integration flow, from queuing system 304. In embodiments, backup integration server(s) 306 may receive the first state message from the queuing system 304 without having to retrieve it. In embodiments, when backup integration server(s) 306 retrieves/reads the first state message, this action prevents other backup integration servers from also following the integration request.

At block 330, backup integration server(s) 306 initializes the integration flow based on the flow correlation ID. As used herein, initializing the integration flow prepares the flow to begin processing, but without beginning the integration flow processing. Initializing the integration flow further comprises determining, based on the first state message, at least one of: the pod name for the integration server that is running the flow (i.e., primary integration server 302), the message flow that will be invoked or processed, an identification (ID) for correlating requests and replies related to the integration flow (e.g., a correlation ID), and/or the state that is causing the integration flow to be triggered (e.g., the content of a queued message or the content of an HTTP request). Using this determined information, backup integration server(s) 306 initializes the integration flow by preparing the necessary resourced to process the integration flow based on the first state message and/or correlation ID.

At block 335, backup integration server(s) 306 sends a confirmation message comprising an indication that the first state message was retrieved. Specifically, backup integration server(s) 306 sends the confirmation message to the queuing system 304. In embodiments, the confirmation message may further indicate that the integration flow is initialized and ready for processing.

At block 340 of FIG. 3B, queuing system 304 receives the confirmation message and stores it in a reply queue. As used herein, a reply queue is a queue for storing reply information, received from backup integration servers, related to the integration flow while processing an integration request. In embodiments, the reply information is stored such that a primary integration server (e.g., primary integration server 302) can access and retrieve the reply information. In embodiments, queuing system 304 may be configured to send the reply information stored in the reply queue to primary integration server.

At block 345, primary integration server 302 receives the confirmation message comprising an indication that the backup integration server(s) retrieved the first state message. In response to receiving the confirmation message, at block 350 primary integration server 302 processes the first integration request.

At block 355, backup integration server(s) 306 processes the integration flow as a backup integration server. However, because backup integration server(s) 306 does not directly interact with any other applications or programs, it does not receive non-deterministic data. As explained above, non-deterministic data is data that cannot be reproduced by a backup integration server. For example, non-deterministic data may include data that is received in response to an external request made to an external application or program. Non-deterministic data may also include data that requires, relies on, or is the result of, a time-based calculation, a randomized variable generation, and/or a timestamp. In other words, non-deterministic data is data that is not guaranteed to produce the same result if run by a different integration server at a different time. Thus, non-deterministic data is data that is needed to continue processing the integration flow that can only be obtained by the primary integration server. Accordingly, backup integration servers rely on the primary integration server to obtain state data such as non-deterministic data.

At block 360, in response to determining that the integration flow processing requires, relies on, or is the result of, a non-deterministic data, backup integration server(s) 306 pauses the processing until the non-deterministic data is retrieved. In embodiments, backup integration server(s) 306 may request state information and/or non-deterministic data from queuing system 304.

At block 365, primary integration server 302 sends a second state message comprising the flow correlation ID and non-deterministic data. As explained above, non-deterministic data is data that cannot be reproduced by a backup integration server and should be shared with the backup integration server to allow it to keep up with the integration flow processing. In embodiments, primary integration server 302 may be configured to send a state message to the queuing system 304 at every step of the integration flow processing. In other words, even when there is no non-deterministic data to share, primary integration server 302 sends a state message to queuing system 304 after each step of the integration flow processing.

At block 370 of FIG. 3C, queuing system 304 receives the second state message and stores it in the state queue. As noted above, in embodiments, the state information is stored such that backup integration servers (e.g., backup integration server(s) 306) can access and retrieve the state information. In embodiments, queuing system 304 may be configured to send the state information stored in the state queue to backup integration servers.

At block 375, backup integration server(s) 306 retrieves the second state message comprising the flow correlation ID and the non-deterministic data from the state queue of queuing system 304. At block 280, in response to retrieving the non-deterministic data, backup integration server(s) 306 resumes the processing using the non-deterministic data. In embodiments, the process described with respect to blocks 350-380 repeat until the integration request is completed.

In embodiments, the primary integration server may fail (i.e., stall, disconnect, freeze, and/or fail to meet a time requirement) for any one of a number of reasons. Accordingly, in embodiments, at block 385 primary integration server 302 may optionally detect that it has failed. In such embodiments, primary integration server 302 may optionally send a message indicating that has failed and can no longer process the integration request.

At block 390, in response to determining that the first integration server has failed, backup integration server(s) 306 processes the integration flow as a primary integration server. In other words, when primary integration server 302 fails, one of backup integration server(s) 306 steps in and processes the integration request from the step where primary integration server 302 failed (i.e., stalled, disconnected, froze, and/or failed to meet a time requirement). This also means that the new primary integration server begins executing all of the non-deterministic actions itself and/or with the assistance of an outside application or program.

In an embodiment, a backup integration server (e.g., backup integration server(s) 306) may determine that the primary integration server has failed by requesting the status of a pod related to the primary integration server. In such embodiments, the backup integration server may request the pod status from an API server (e.g., a K8S API server). For example, if the primary integration server was operating on pod number 1, the backup integration server could request the status of pod number 1 at an API server. If the API server indicates that pod number 1 is no longer running, the backup integration server may become the primary integration server and take over processing the integration request.

In embodiments where there were multiple backup integration servers, one of the backup integration servers becomes the primary integration server while the other backup integration server(s) continue operating as backup integration servers. In such embodiments, each of the operating integration servers continues processing the integration request. In embodiments, continuing to process the integration request means repeating blocks 350-380 repeat until the integration request is complete.

In embodiments where there was only one backup integration server, when the backup integration server becomes the primary integration server a new backup integration server is recruited. In such embodiments, the state information of the integration flow is shared with (or made available to) the newly recruited backup server. Based on the state information and the current step within the integration request, the newly recruited backup integration server continues processing the integration request from the point where the former backup integration server left off.

Figure 4:
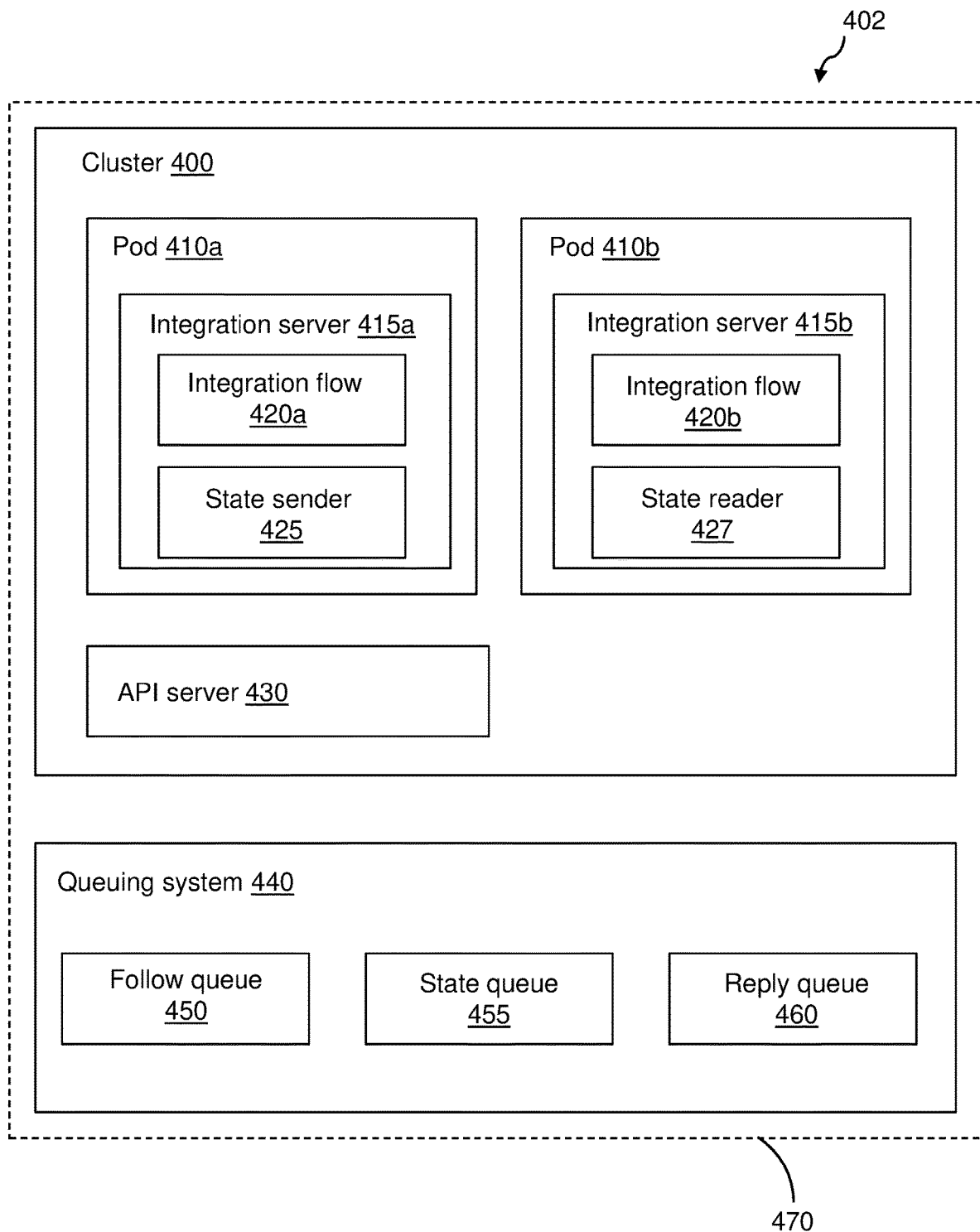
FIG. 4 shows a block diagram of an exemplary environment in accordance with aspects of the present invention.

FIG. 4 shows a block diagram of exemplary environment 402 in accordance with aspects of the invention. In embodiments, environment 402 includes cluster 400 (e.g., a Kubernetes cluster or another container-based system) and queuing system 440. As shown, cluster 400 and queuing system 440 are not part of the same processing system. However, in embodiments, cluster 400 and queuing system 440 may optionally be a part of the same processing cluster, as indicated by processing environment 470. In embodiments, cluster 400 may comprise any type of container-based computing cluster, including: single-zone, multi-zone, regional, VPC-native, and/or route-based clusters.

As illustrated in FIG. 4, cluster 400 may comprise one or more pods (e.g., K8S pods), including for example, pods 410a-b. In embodiments, pods 410a-b may comprise an integration server that is running within a container. Each of pods 410a-b respectively comprise integration servers 415a-b that are running as a container. In embodiments, integration server 415a operates as a primary integration server and processes an integration request. In such embodiments, integration server 415b may operate as a backup integration server in accordance with the methods described above with respect to FIGS. 3A-C. In additional embodiments the roles of integration servers 415a-b may be switched. That is, integration server 415b may operate as a primary integration server and integration server 415a may operate as a backup integration server. However, to act or operate as a primary integration server, integration server 415b would need a state sender (not shown) and to act or operate as a backup integration server, integration server 415a would need a state reader (not shown).

Each of integration servers 415a-b respectively comprise integration flow 420a-b. Integration flow 420a-b comprises the logic for processing the integration request. As illustrated, integration server 415a further comprises state sender 425. As explained above, a primary integration server may send state messages about a running integration flow so backup integration servers can follow along. In the embodiment depicted in FIG. 4, state sender 425 is responsible for sending the state messages. In embodiments, state sender 425 may comprise one or more instances of state sending module 215 of FIG. 2. In embodiments, servers 415a-b do not communicate directly with each other. Rather, servers 415a-b may pass messages to each other through the follow queue 450, state queue 455, and/or reply queue 460 of queuing system 440.

As illustrated, integration server 415b further comprises state reader 427. As explained above, a backup integration server may retrieve/read state messages from a queuing system to follow the processing and to obtain non-deterministic data. In the embodiment depicted in FIG. 4, state reader 427 is responsible for retrieving/reading the state messages. In embodiments, state reader 427 may comprise one or more instances of state receiving module 220 of FIG. 2.

As illustrated in FIG. 4, cluster 400 further comprises API server 430 (e.g., a K8S API server). In embodiments, API server 430 may be configured to allow and/or share access of the details of resources on a cluster (e.g., cluster 400) with other pods within the cluster, including pods 415a-b. In embodiments, the details of resources on the cluster may comprise a state of the running pods. In an embodiment, when a backup integration server polls (or calls) API server 430 to determine whether the primary integration server is still running, it may do so by requesting the status of a pod associated with the primary integration server. For example, if the primary integration server was operating on pod number 1, the backup integration server could request the status of pod number 1 at API server 430. If API server 430 indicates that pod number 1 is no longer running, the backup integration server may become the primary integration server and take over processing the integration request.

Queuing system 440 comprises follow queue 450, state queue 455, and reply queue 460. In embodiments, queuing system 440 may comprise one or more instances of queuing system 225 of FIG. 2. Queuing system 440 holds/stores messages using a correlation ID which enables the queuing system 440 to be used by/between many integration requests and to communicate with many integration servers. In embodiments, queuing system 440 may be located in the same cluster as pods 410a-b. In other embodiments, queuing system 440 may be located in a may be available as a software as a service (SaaS) in a cloud server, or it may be located in an entity's storage. In an embodiment, queuing system 440 may comprise an IBM® message queue (MQ) queuing system.

In embodiments, follow queue 450 is used to hold/store a message when the integration flow starts and wants to be followed. In embodiments, follow queue 450 may also hold/store triggering data, the flow to be triggered, and a correlation ID for all further queue-based interactions (e.g., sending, receiving, storing, and/or holding). In other words, follow queue 450 holds/stores the information needed for the backup integration server to begin processing the integration flow. The message for starting the integration flow is stored in a manner such that an integration server can retrieve the data and begin operating as a backup integration server.

In embodiments, state queue 455 comprises a queue for integration flow processing data related to processing the integration request. State queue 455 stores/holds data received from a primary integration server after each step of the integration flow. In embodiments, state queue 455 is configured to send the received data to a backup integration server and/or otherwise make the data available for retrieval, reading, and/or downloading by the backup integration server. Each message carries, or is marked with, the correlation ID so the systems can determine the integration flow and/or request of the message.

In embodiments, reply queue 460 comprises a queue for integration flow processing data related to the processing performed at the backup integration servers. Reply queue 460 stores/holds data received from one or more backup integration servers so the primary integration server can be aware that a backup integration server is also processing the integration flow. As provided above, in embodiments, the primary integration server will not process the integration request until it is made aware that a backup integration server is also processing the integration flow.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
retrieving, by a second integration server from a queuing system, a first state message comprising information related to a data integration flow;
initializing, by the second integration server, the data integration flow based on a flow correlation identification (ID) determined based on the first state message;
processing, by the second integration server, the data integration flow as a backup integration server to a first integration server; and
in response to determining that the first integration server has failed, processing, by the second integration server, the data integration flow as a primary integration server.

2. The computer-implemented method of claim 1, further comprising requesting, by the second integration server, a status of a pod related to the first integration server.

3. The computer-implemented method of claim 2, further comprising receiving, at the second integration server from an application program interface (API) server, the status of the pod related to the first integration server, wherein the determining that the first integration server has failed is based on the received status of the pod related to the first integration server.

4. The computer-implemented method of claim 1, wherein the first state message further comprises at least one data selected from a group consisting of: a pod name for a pod related to the first integration server, the data integration flow to be processed, and a state that is triggering the data integration flow.

5. The computer-implemented method of claim 1, further comprising sending, by the second integration server to the queuing system, a confirmation message comprising an indication that the second integration server retrieved the first state message.

6. The computer-implemented method of claim 1, further comprising:
in response to determining that the processing the data integration flow relies on a non-deterministic data, pausing the data integration flow processing by the second integration server;
retrieving, by the second integration server from the queuing system, a second state message comprising the flow correlation ID and the non-deterministic data; and
in response to retrieving the non-deterministic data, resuming the data integration flow processing by the second integration server.

7. The computer-implemented method of claim 6, wherein the non-deterministic data comprises data that is not guaranteed to produce a same result if run by a different integration server at a different time.

8. The computer-implemented method of claim 1, further comprising, in response to determining that the first integration server has failed, recruiting a third integration server to serve as a backup integration server to the second integration server.

9. A computer program product comprising one or more computer readable storage media having program instructions collectively stored on the one or more computer readable storage media, the program instructions executable to:
retrieve, by a second integration server from a queuing system, a first state message comprising information related to a data integration flow;
initialize the data integration flow based on a flow correlation identification (ID) determined based on the first state message;
process the data integration flow as a backup integration server to a first integration server; and
in response to determining that the first integration server has failed, process the data integration flow as a primary integration server.

10. The computer program product of claim 9, wherein the program instructions are further executable to request a status of a pod related to the first integration server.

11. The computer program product of claim 10, wherein the program instructions are further executable to receive, from an application program interface (API) server, the status of the pod related to the first integration server, wherein the determining that the first integration server has failed is based on the received status of the pod related to the first integration server.

12. The computer program product of claim 9, wherein the first state message further comprises at least one data selected from a group consisting of: a pod name for a pod related to the first integration server, the data integration flow to be processed, and a state that is triggering the data integration flow.

13. The computer program product of claim 9, wherein the program instructions are further executable to send, to the queuing system, a confirmation message comprising an indication that the first state message has been retrieved.

14. The computer program product of claim 9, wherein the program instructions are further executable to:
in response to determining that the processing the data integration flow relies on a non-deterministic data, pause the data integration flow processing;
retrieve, from the queuing system, a second state message comprising the flow correlation ID and the non-deterministic data; and
in response to retrieving the non-deterministic data, resume the data integration flow processing.

15. The computer program product of claim 14, wherein the non-deterministic data further comprises data resulting from a time-based calculation or a randomized variable generation.

16. The computer program product of claim 9, wherein the program instructions are further executable to recruit, in response to determining that the first integration server has failed, a third integration server to serve as a backup integration server to the second integration server.

17. A system comprising:
a processor set, one or more computer readable storage media, and program instructions collectively stored on the one or more computer readable storage media, the program instructions executable to:
retrieve, by a second integration server from a queuing system, a first state message comprising information related to a data integration flow;
initialize the data integration flow based on a flow correlation identification (ID) determined based on the first state message;
process the data integration flow as a backup integration server to a first integration server; and
in response to determining that the first integration server has failed, process the data integration flow as a primary integration server.

18. The system of claim 17, wherein the program instructions are further executable to:
request a status of a pod related to the first integration server; and
receive, from an application program interface (API) server, the status of the pod related to the first integration server, wherein the determining that the first integration server has failed is based on the received status of the pod related to the first integration server.

19. The system of claim 17, wherein the program instructions are further executable to:
in response to determining that the processing the data integration flow relies on a non-deterministic data, pausing the data integration flow processing by the second integration server;
retrieving, by the second integration server from the queuing system, a second state message comprising the flow correlation ID and the non-deterministic data; and
in response to retrieving the non-deterministic data, resuming the data integration flow processing by the second integration server.

20. The system of claim 17, wherein the program instructions are further executable to recruit, in response to determining that the first integration server has failed, a third integration server to serve as a backup integration server to the second integration server.

* * * * *